G. MERSEREAU.
PROCESS OF CHLORINATING AND PRODUCTS THEREOF.
APPLICATION FILED MAR. 27, 1913.
1,224,485.
Patented May 1, 1917.
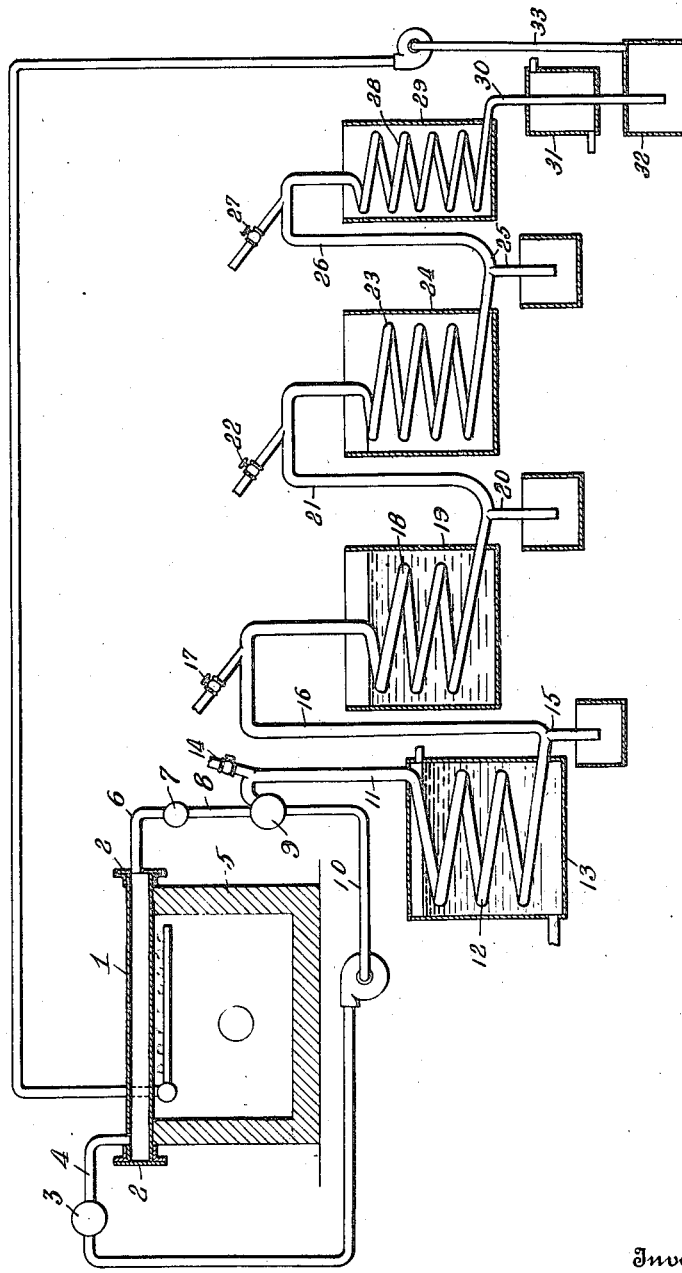

UNITED STATES PATENT OFFICE.

GAIL MERSEREAU, OF NEW YORK, N. Y., ASSIGNOR TO CHEMICAL DEVELOPMENT COMPANY, A CORPORATION OF MAINE.

PROCESS OF CHLORINATING AND PRODUCTS THEREOF.

1,224,485.

Specification of Letters Patent.

Patented May 1, 1917.

Application filed March 27, 1913. Serial No. 757,146.

*To all whom it may concern:*

Be it known that I, GAIL MERSEREAU, a citizen of the United States, residing at New York, in the county of New York and State of New York, have invented certain new and useful Improvements in Processes of Chlorinating and Products Thereof, of which the following is a specification.

This invention relates to processes of chlorinating and products thereof; and it comprises a method wherein heavy petroleum oil is passed through a heated zone at a temperature and a rate of speed sufficient to give a substantial proportion of gases and a substantial proportion of unchanged heavy oil, the gas is cooled and the unchanged oil is removed carrying with it low-boiling bodies, the purified gas is advantageously mixed with successive proportions of chlorin at varying temperatures advantageously in one or more dark chambers, and the carbon chlorids condensed. The condensate may be fractionated to obtain a fraction of a boiling point between 75° and 105°; and the invention also comprises as a new composition of matter a thin, pleasant smelling substantially uninflammable liquid having a boiling point between 75° and 105°, being a good solvent of oils, fats and greases, having a weight of only about 10 pounds per gallon or a specific gravity of about 1.2, containing about 70 per cent. chlorin and consisting of a mixture of organic chlorids containing ethylene and propylene dichlorids in a ratio of about 2:1; all as more fully hereinafter set forth and as claimed.

For many purposes, as in the extraction of oil and grease from oil seeds, such as cottonseed, linseed, etc., from fish, from dress goods, from wool, etc., it is desirable to have a substantially uninflammable, easily volatile liquid which is a good solvent for oil and grease and is readily evaporated, distilled, recovered or handled without risk of fire. Carbon tetrachlorid is generally used for this purpose and has many advantages; but it is expensive to make, and the manufacture is by no means cheap or free of danger since it is generally manufactured from carbon bisulfid as a raw material. Its heaviness is also against it since a gallon weighs in excess of 13 pounds. High density is of course no advantage in an oil solvent. Further, it contains 92 per cent. chlorin which is much more than is necessary to make a material substantially uninflammable. This excessive amount of chlorin also adds to the expense of manufacture. The odor of the tetrachlorid is also strong, and, to many people, unpleasant. Chloroform is more expensive than the tetrachlorid and for this reason and because of its characteristic odor it is not used commercially as a grease solvent. In the art, efforts have been made to lighten and cheapen carbon tetrachlorid by mixing it with more or less gasolene or other volatile hydrocarbons which are lighter, cheaper substances; mixtures of this sort being well known in the trade as grease removers for garments. Unfortunately these admixtures with inflammable substances are apt to destroy the fireproof qualities of the liquid. It is an object of the present invention to make volatile chlorin-containing carbon compounds of good solvent power for grease and oils and of less weight which shall be sufficiently fireproof and of pleasanter odor; and to do this by a simple, cheap and ready method, using cheap materials.

In the present invention heavy petroleum oils, best of the type of those known as fuel oils, are submitted to a brief heating in the neighborhood of 700° C. The temperature may be as low as 650° or as high as 850°, but in general it is better between 700° and 750°, and the heating should be so brief as to leave unchanged oil vapors in the sphere of reaction and emerging with the gas produced and as to remove the gas substantially as rapidly as formed. Any continued heating of the gas breaks it down to give tars, benzenoid bodies, etc. Advantageously, the oil may be passed at a rapid rate through a comparatively short length, say 30 to 70 inches, of hot narrow tubing, such as a half inch to an inch iron or copper tube. The tubing should not be of greater internal diameter than an inch or so since experience shows unevenness of reaction and a disadvantageous character of the product where any portion of the chamber afforded by the channel in the oil treating conduit is more than an inch or so away from the heated wall. For this reason if retorts are substituted for the narrow tube the retort should be flat with one internal diameter not over an inch or so. A flat, bottom heated, top cooled sheet iron or cast iron retort of, say, two inches internal height, gives good results. The oil should be passed through from end to end. The presence of catalytics is of no particular advantage. Absence of coky carbon is desirable.

Under these conditions a part of the oil breaks up into a mixture of unsaturated gases and saturated gases while a portion of the oil remains unchanged. The unsaturated gaseous compounds formed are of such character and in such mutual proportions as to give advantageous results in the present process. By passing the gaseous products from the sphere of reaction through a suitable cooling arrangement the unchanged oil may be separated out, carrying with it any light, oily cracked products of the nature of gasolene. The excess of oil acts as an efficient scrubbing means here, removing from the gas any of these light gasolene-like bodies which may have been formed. This is an important feature since any of these substances going forward with the gas will not only waste chlorin but give products of a character unsuitable for the present purposes. With heavy oils of the type of fuel oil used as the raw material, and with a sufficient excess of oil, say 20 to 50 per cent., going through the sphere of reaction unchanged, ordinary air cooling of the gas will be sufficient to take out practically all of the condensable non-gaseous matter. The heavy oil condensed out and carrying light cracked products may be simply returned for admixture with fresh oil and repassage. With proper control of conditions it is substantially tar free. Should tar form by improper operation, it is better not to return the excess oil. If desired, refrigerating means may be used beyond the air-cooling means. The cooled gases coming from the condenser are taken directly into temperature-controlled chambers and admixed with chlorin. Mixing should be in the dark, that is opaque vessels should be used.

Diluents, such as nitrogen, carbon dioxid, products of combustion, etc., may be employed to slow down and regulate the chlorinating action if desired, but are not ordinarily necessary. The gas separated from the unpyrolyzed oil contains saturated gases like ethane, which are in themselves good diluents and aid in making the action regular. Substitution being obviated or restricted in the present invention, gases like ethane are good diluents. The use of steam in the mixture to any extent is ordinarily not advisable.

It is usually desirable to employ a little less chlorin than the gases are capable of taking up easily. This saves substitutive reactions and corrosion of the apparatus by chlorin and hydrochloric acid occurring further on.

The conditions under which the chlorination occurs are not a matter of indifference. If the proper amount of chlorin (as shown by the bromin absorption test) is directly mixed with the gas and the mixture kept cool, as by performing the operation in an air cooled vessel, the reaction is comparatively slow; it starts quickly but soon slows up and requires more time for completion than is practicable. If light strikes the reaction mixture, substitutive reactions take place. But by performing the reaction in a vessel kept at a temperature of about 100° C. by means of a boiling water jacket or steam jacket, reaction is good and ready, but even in the dark some substitution takes place. Good results may however be so obtained using a subsequent purifying step in treating the product. On passing the mixture of chlorin and oil gas, in about the proper proportions, through a lead tube in a hot water jacket, chlorination is complete in a foot or so of travel. On condensing the material and then distilling, its boiling point will at first be found between 80° and 90°, but the thermometer quickly goes to 150° C. On continuing the heating and distilling, the material coming over, when condensed and re-rectified, will however be found to have a boiling point between 100° and 150° C. Apparently some of the HCl produced by substitutive reactions combines to form an additive compound with the organic chlorids; a compound having a boiling point or decomposing point of about 150°. Therefore, in directly chlorinating in the manner described, it is better to take the condensed liquid product and mix with lime, soda, etc., before distilling. This decomposes the additive compound and gives a distillate of the properties desired. In the still there remains a mixture of alkali chlorids and a heavy polymerized material similar to a heavy pulverized rubber.

The reaction just described, while convenient and giving a good product, nevertheless is somewhat wasteful of chlorin, since half of whatever is used in substitution is wasted. Further, the organic chlorids formed in substitution are not quite so desirable for my purposes. On the other hand, the uninflammability of the product is good.

A better method of operations for most purposes is obtained by chlorinating in stages with removal of the products between stages. A fraction of the chlorin is added in each stage. This aids in preventing loss of chlorin by solution in the condensed chlorination product and consequent removal from the sphere of activity. In a good embodiment of my invention, I take a cooled oil gas and mix it with a fraction of the total chlorin required and run the mixture through a lead pipe immersed in a tub maintained at about 15° C. For a moderate capacity, the lead pipe may be 1.5 inch internal diameter, tapering down to a ⅜ inch pipe. The total length of the lead pipe should be enough to cool the mixture of gases to 15° C if they be warm and react readily on heating, or to heat them to 15° C. if they be cool on mixing. Beyond this pipe should be a trap where the liquid can be caught. Beyond this trap a further portion of chlorin is mixed with the residual gases and the mixture is run through another lead tube in a bath maintained at about 50° C. Here a further reaction takes place and a further quantity of organic chlorids is formed. Not much trouble is experienced in keeping the gas mixture at a definite point in this second stage. The length of the tubing required is about the same as that in the first stage. The newly formed organic chlorids are once more trapped off and the residual gas is now admixed with the rest of the chlorin required. The mixture is next run through a third length of lead pipe in a bath maintained at about 100° C. This third length may be quite short as the reaction is vigorous at this point. Beyond this reaction chamber the gases should be sent through a good condenser to remove the vapors of organic chlorids. The organic chlorids recovered in all three stages may be reunited and distilled. Nearly all the material will pass over between 75° or 80° and 105° and this material is the new grease solvent of the present invention. In the first stage with the action at 15° C. any small amounts of triple bond hydrocarbons which may be present are chlorinated and also a major fraction of the double bond hydrocarbons. In the second stage nearly all the residue of the double bond hydrocarbons are chlorinated. In the third stage the residue of the unsaturated compounds is acted on. If there be any amount of high molecular hydrocarbons, such as propane, in the gas, they may undergo some substitution in the third stage, but ordinarily with proper preparation of the gas there is not much of any saturated compound save ethane present and this does not chlorinate readily under the conditions described.

In the described three-stage operation there is ordinarily just about enough substitution occurring to compensate for the slight inflammability of the propylene chlorid.

If desired, of course the three fractions of the compound may be rectified separately, but ordinarily there is not much use in this. A little lime or other alkali may be used in the rectification to take care of any hydrochloric acid which may be formed. The residue in the rectifying still may be further fractionated to regain high boiling fractions for other uses.
The residual gas going beyond the chlorinating apparatus and the condensers may be burned or otherwise utilized. It may be chlorinated to form ethyl chlorid and other products by treatment with chlorin in chambers exposed to actinic light such as that furnished by a mercury arc lamp.

The volatile fraction of the stated average boiling point is a thin, pleasantly smelling liquid of good solvent properties for oil and grease and sufficiently volatile to enable its advantageous use for removing grease spots and stains and for extracting oils and resins from various vegetable and animal materials. It contains about 70 per cent. chlorin and is substantially uninflammable, just flashing a little but not igniting on contact with a match. It is fairly stable and may be rectified and handled in iron apparatus. While not as heavy as carbon tetrachlorid, weighing about 10 pounds per gallon, it is equally efficient gallon for gallon as a grease solvent.

Other methods of breaking up oil to produce a gas carrying unsaturated compounds may be used but the described method is convenient and advantageous as producing a gas in which the various unsaturated compounds are in mutual proportions about right to give a chlorin-containing product of the boiling point and properties here desired without absorbing undue amounts of chlorin.

Crude petroleums or fuel oils as free as possible from cyclic hydrocarbons are the best for my purposes. If the gas is made as described, cyclic hydrocarbons, such as benzol, are not produced *de novo* to any detrimental extent since the low temperature and the presence of the excess of shielding oil prevent fargoing reactions at the expense of ethylene, etc., but where the oil contains such cyclic hydrocarbons originally they reappear with the gas as benzol, toluol, etc. The excess of oil in condensing tends to absorb these bodies but as the excess is usually returned for re-passage benzol accumulates in the system. With oil containing aromatic compounds, therefore, efficient chilling means or cold wash oil should be applied to the gas beyond the oil-removing means since it is desirable not to have benzol present in the gas going to the chlorinating apparatus. Benzol is of course valuable and may be easily recovered in the manner described but the yield of olefinic gas proper is diminished concomitantly with the production of benzol where fuel oils containing cyclic compounds are used. Where the recovery of benzol is not an object, as it may be, I therefore prefer to use oils with a paraffin base.

Even with oils having a paraffin base, it is often desirable to cool the gas efficiently, as by refrigerating means, or scrub it with chilled wash oil, prior to chlorinating and subsequent to removing the oil excess as this gives a purer gas and consequently a purer chlorination product while the volatile oily bodies and liquefiable gases removed are worth while recovering.

While any other kind of chlorin may be employed, such as chlorin from bleaching powder, compressed commercial chlorin, etc., I prefer to use chlorin directly from electrolytic cells as this appears to be slightly more active than chlorin which has stood for a while.

In the accompanying illustration I have shown, more or less diagrammatically, certain apparatus capable of use in the described process. In this showing, the illustration is partly in vertical section and partly in elevation.

Element 1 is a shallow flat retort, here shown as made of sheet iron, such as 3/18 inch boiler plate. At each end it is provided with a removable closure 2 for opening and closing, as when coky carbon begins to form. With the formation of coky carbon the operation should be interrupted since this has a catalytic, self-increasing action upon the decomposition of oil. A convenient type of retort is made by taking two parallel 2-inch H angle irons each about 6 feet long for the sides and riveting sheet iron to them for the top and bottom plates. For gasifying a couple of gallons of oil per minute, the retort may be about 3 feet wide. Oil or oil vapor is fed into it from main 3 through valved pipes 4, of which there should be a plurality along the width of the retort. Heat is afforded by furnace chamber 5 on the top of which the retort is set. Gas is led out through a plurality of pipes 6 (one is shown) leading to main 7. From this main depend a plurality of air-cooled pipes 8 for condensing out heavy oil. These pipes go to main 9 having return 10 for excess of oil. Gas is taken from the main through 11 and passes through cooler 12, shown as submerged in tub 13. Chilled wash oil may be sent into contact with the gas through valved inlet 14. The condensate of chilled condensed materials, or of chilled oil carrying the same, escapes through trap 15. The chilled gas passes through 16 where it is joined by a portion of chlorin from valved inlet 17 and through the worm 18 in tub 19. This tub is kept filled with water at about 15° C. As shown, the tube is of less section at its lower end 15 than at the worm 18. Condensed carbon chlorids are taken off by a trap 20. The residual gas passes onward through 21 and is joined by more chlorin from valved inlet 22. The mixture of gas and chlorin passes through worm 23 in tub 24 filled with water maintained at about 50° C. Condensing carbon chlorids are removed through trap 25. Residual gas passes onward through 26 and is joined by the rest of the chlorin from valved inlet 27. The mixture of gas and chlorin passes through worm 28 in tub 29 which may be full of water at 100° C. The emerging mixture of gas and vapors passes through 30, past condenser 31. Condensed liquid is received in 32, while uncondensed gases pass backward through conduit 33 to be used in heating the furnace 5.

The carbon chlorids received in 20, 25 and 32 may be separately rectified and treated, but ordinarily it is as well to reunite them and rectify or otherwise treat as one body. Operating in the manner described, all three portions will be substantially free of free chlorin, not only obviating a waste of chlorin but preventing undesirable reactions during rectification and other treatment. To prevent chlorin remaining in the third or final condensate the process should ordinarily be conducted with a little less chlorin than corresponds to the unsaturated hydrocarbons as shown by the bromin test. The carbon chlorids may be rectified in any ordinary apparatus. The high-boiling residue may be saved until it accumulates and worked up for other purposes.

It is expedient with these carbon chlorids to agitate with or filter through a little fullers' earth, bone black or similar agent. Some of the Florida clays may be used for this purpose. This takes out certain strong smelling by-products and renders the material of better odor. A little bone black or fullers' earth suffices for treating relatively large quantities of material. This treatment with a deodorant may be before or after rectification.

In addition to its uses as a grease solvent, the solvent of the present invention has many advantages in making rubber cement. It may be used for this purpose alone or in admixture with other solvents. The cement made with the present liquid has the great advantage of being uninflammable while the solvent powers of the liquid for rubber are good.

The hydrocarbons removed at 15 by chilled wash oil may be recovered. They have characteristic properties which make them useful for a number of purposes.

Owing to the fact that double and triple bond hydrocarbons appear to be present, as indicated above, the carbon chlorid mixture obtained as a product appears to be very complex, and to contain a notable fraction of substances having four or six chlorin atoms per molecule.

A great advantage of the present process is the possibility which it offers for complete chlorination of the olefins of oil gas together with a separate or conjoint recovery of the products of such chlorination as may be desired. Of the olefins contained in oil gas cooled to ordinary temperature, the greater part may be said to be ethylene, propylene and less amounts of the butylenes, together, in the event that the cooling was not complete or scrubbing with oil was not thorough, more or less of the amylenes. These unite with chlorin in the reverse of the order mentioned; that is, the 5-carbon olefins unite more readily than the 4-carbon and the 4-carbons unite more readily than the 3-carbon. The 2-carbon olefin or ethylene does not unite readily with chlorin in the cold; and it is a great advantage of this invention that ready chlorination of the ethylene may be effected with the obtaining of substantially pure products. In the structure shown, and by the process described, the chlorination taking place in the cooled tube, will be substantially only that of the higher olefins and propylene while in the second tube chlorination will be mainly of the propylene.

The ethylene chlorinated in the tube kept at the higher temperature and, if the operation is properly controlled, the liquid condensed from the chlorinating operation in this tube is, or may be, nearly pure ethylene chlorid.

What I claim is:—

1. The process of making a solvent which comprises cracking petroleum oil to yield a complex mixture of unsaturated hydrocarbon gases and a gas adapted to serve as a diluent, removing condensable matter from said gas and treating the residual gas with chlorin under temperature-controlled conditions.

2. The process of making a solvent which comprises cracking petroleum oil to yield a complex mixture of unsaturated hydrocarbon gases and a gas adapted to serve as a diluent, removing condensable matter from said gas and treating the residual gas with chlorin under temperature-controlled conditions and chlorinating the residual gas, said chlorinating operation comprising a treatment of said gas with chlorin at about 100° C.

3. The process of making a solvent which comprises treating an oil gas with chlorin in a plurality of stages, the chlorinated product of each such stage being separately removed.

4. The process of making a solvent which comprises treating an oil gas with chlorin in a plurality of stages under temperature-controlled conditions, the temperature in each successive stage being higher than in the next preceding stage.

5. The process of making a solvent which comprises treating an oil gas with chlorin in a plurality of stages under temperature-controlled conditions, the temperature in one such stage being about 15° C. and in another about 100° C.

6. The process of making a solvent which comprises treating an oil gas with chlorin in a plurality of stages under temperature-controlled conditions, the temperature in one such stage being about 15° C., and in another about 100° C., there being an intermediate stage at an intermediate temperature.

7. The process of making a solvent which comprises partially gasifying a heavy fuel oil, at a temperature high enough to form a large proportion of mixed unsaturated carbon compounds and a diluent gas, condensing out the excess of oil, and treating the resulting gas in a dark chamber with slightly less chlorin than corresponds to bromin absorption as shown by test.

8. As a new composition of matter, a volatile substantially uninflammable liquid having a boiling point between 75° and 105° C. with a major fraction distilling between 80° and 90°, containing about 70 per cent. chlorin, having a specific gravity of about 1.2 and consisting mainly of ethylene and propylene chlorids.

9. The process of making a solvent which comprises cracking oil to yield a complex mixture of unsaturated hydrocarbon gases and a gas adapted to serve as a diluent, removing condensable matter from said gas, treating with chlorin under temperature-controlled conditions to obtain carbon chlorids and treating the carbon chlorids with a deodorant.

10. The process of making solvents which comprises mixing oil gas and chlorin.

11. As a new composition of matter, a volatile substantially uninflammable liquid having a minimum boiling point near 75° C. and boiling off gradually till about 150° C. is reached near which point decomposition sets in, having a specific gravity not far removed from 1.2, comprising ethylene and propylene chlorids, and distillable from an alkaline substance to yield a similar liquid boiling principally between 75° and 105° C.

12. The process of making solvents which comprises mixing chlorin with oil gas free from compounds condensable at ordinary temperatures and regulating the reaction by controlling the temperature thereof to produce substantially only addition compounds.

13. The process of making a solvent which comprises treating an oil gas rich in unsaturated aliphatic series carbon compounds with chlorin under conditions adapted to limit the reaction largely to formation of addition products and separating the residual gas from the resultant solvent, the gas being a mixture comprising one, two, and three bond hydrocarbons before said treating.

14. The process of making a solvent which comprises treating an oil gas rich in unsaturated carbon compounds with chlorin in the dark under temperature controlled conditions, said chlorinating operation comprising a treatment of said gas with chlorin at about 100° C. and also a treatment at a lower temperature, said last named treatment adapted to chlorinate only a part of the unsaturated hydrocarbons present.

15. A composition of matter comprising a complex mixture of chlorinated hydrocarbons of the group formed by treating oil gas which has been produced at a comparatively low temperature with chlorin, to produce mainly additive compounds.

16. A composition of matter comprising a mixture of chlorinated hydrocarbons having two, four and six chlorin atoms per molecule, and distillable to produce a liquid boiling around 75° C. to 105° C. and containing about 70% of chlorin.

17. The process of making a solvent which comprises the chlorination of oil gas in stages, at successively higher temperatures.

18. The process of making a solvent which comprises the complete chlorination of oil gas in stages adapted to selectively chlorinate the compounds therein.

19. The process of making a solvent which comprises reacting upon oil gas with chlorin in an amount slightly less than that corresponding to the bromin absorption of such gas.

In testimony whereof, I affix my signature in the presence of two subscribing witnesses.

GAIL MERSEREAU.

Witnesses:
   FLORENCE MAUS,
   EDWARD GORDON.